US012614821B2

(12) United States Patent
Li et al.

(10) Patent No.: US 12,614,821 B2
(45) Date of Patent: Apr. 28, 2026

(54) HIGH ENERGY DENSITY CYLINDRICAL BATTERY CELL DESIGN WITH STACKED ELECTRODES

(71) Applicant: GM GLOBAL TECHNOLOGY OPERATIONS LLC, Detroit, MI (US)

(72) Inventors: Binsong Li, Troy, MI (US); Liang Xi, Northville, MI (US); Srilakshmi Katar, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 525 days.

(21) Appl. No.: 18/335,403

(22) Filed: Jun. 15, 2023

(65) Prior Publication Data

US 2024/0421449 A1      Dec. 19, 2024

(51) Int. Cl.
| | |
|---|---|
| *H01M 50/559* | (2021.01) |
| *H01M 4/134* | (2010.01) |
| *H01M 50/107* | (2021.01) |
| *H01M 50/367* | (2021.01) |
| *H01M 50/538* | (2021.01) |

(52) U.S. Cl.
CPC ......... *H01M 50/559* (2021.01); *H01M 4/134* (2013.01); *H01M 50/107* (2021.01); *H01M 50/367* (2021.01); *H01M 50/538* (2021.01)

(58) Field of Classification Search
CPC .. H01M 50/559; H01M 4/134; H01M 50/107; H01M 50/367; H01M 50/538; H01M 10/052; H01M 50/533; H01M 10/0585; H01M 10/0525; H01M 50/474; H01M 50/477; H01M 50/531; Y02E 60/10
See application file for complete search history.

(56) References Cited

U.S. PATENT DOCUMENTS

| | | | | |
|---|---|---|---|---|
| 4,105,831 A | * | 8/1978 | Plasse | H01M 50/394 |
| | | | | 429/162 |
| 2022/0231384 A1 | * | 7/2022 | Okuno | H01M 50/54 |
| 2023/0079224 A1 | * | 3/2023 | Chu | H01M 50/536 |
| | | | | 429/164 |

FOREIGN PATENT DOCUMENTS

| | | | |
|---|---|---|---|
| DE | 102020005583 A1 | | 3/2022 |
| JP | 10334879 A | * | 5/1997 |

* cited by examiner

*Primary Examiner* — Daniel H Lee
(74) *Attorney, Agent, or Firm* — Quinn IP Law

(57) ABSTRACT

A battery cell includes a case and an electrode stack disposed within the case. The battery cell includes an anode including a first conductive tab, a cathode including a second conductive tab, and a separator. The battery cell further includes two electrical connections, each attached to one of the first conductive tab or the second conductive tab and to one of a negative terminal and a positive terminal, respectively. The anode, the cathode, and the separator each include a common perimeter including a first portion matching a shape of an interior surface of the case and a second portion including a cut-out configured to recede from the interior surface. The second portion of the anode, the cathode, and the separator are aligned and create a region between the stack and the interior surface. The tabs and electrical connections are disposed within the region.

20 Claims, 4 Drawing Sheets

HIGH ENERGY DENSITY CYLINDRICAL BATTERY CELL DESIGN WITH STACKED ELECTRODES

BACKGROUND

The disclosure generally relates to a high energy density cylindrical battery cell design with stacked electrodes.

Lithium-ion batteries and lithium metal batteries are desirable candidates for powering electronic devices in the consumer, automotive, and aerospace industries due to their relatively high energy density, high power density, lack of memory effect, and long cycle life, as compared to other rechargeable battery technologies, including lead-acid batteries, nickel-cadmium and nickel-metal-hydride batteries.

A battery cell includes at least one anode and cathode pair. A battery cell includes a traditional polymer separator that contains liquid electrolyte between anode and cathode electrodes. Alternatively, a solid-state battery cell includes a solid electrolyte film as a replacement of the traditional polymer separator. The solid electrolyte may include a first planar primary surface which abuts and contacts a planar primary surface of an anode electrode. The solid electrolyte may include a second planar primary surface which abuts and contacts a planar primary surface of a cathode electrode.

SUMMARY

A battery cell is provided. The battery cell includes an external case including an interior surface. The battery cell further includes an electrode stack disposed within the external case. The electrode stack includes an anode including a first conductive tab, a cathode including a second conductive tab, and a separator. The battery cell further includes a positive terminal and a negative terminal. The battery cell further includes a first electrical connection attached to the first conductive tab and to the negative terminal and a second electrical connection attached to the second conductive tab and to the positive terminal. The anode, the cathode, and the separator each include a common component perimeter including a first portion of the common component perimeter configured for conforming to a shape of the interior surface and a second portion of the common component perimeter including a cut-out configured to recede from the interior surface. The second portion of the common component perimeter of the anode, the second portion of the common component perimeter of the cathode, and the second portion of the common component perimeter of the separator are aligned and create a region between the electrode stack and the interior surface. The first conductive tab, the second conductive tab, the first electrical connection, and the second electrical connection are disposed within the region between the electrode stack and the interior surface.

In some embodiments, the battery cell further includes a support plate disposed next to an end of the electrode stack. The battery cell further includes a compression spring configured for providing a compressive force upon the support plate and the electrode stack and displacing when the electrode stack volumetrically expands.

In some embodiments, the battery cell further includes a plurality of compression springs.

In some embodiments, the electrode stack includes a first electrode stack, and the support plate is a first support plate. The battery cell further includes a second electrode stack disposed within the external case and a second support plate disposed against an end of the second electrode stack. The compression spring is further configured for providing the compressive force upon the second support plate and the second electrode stack and further displacing when the second electrode stack volumetrically expands.

In some embodiments, the external case is a cylinder, and the interior surface includes a first round shape. The first portion of the common component perimeter includes a second round shape configured to match the interior surface.

In some embodiments, the second portion of the common component perimeter includes a flat side.

In some embodiments, the battery cell further includes a separation bracket disposed in the region between the electrode stack and the interior surface configured for separating the first conductive tab and the second conductive tab.

In some embodiments, the battery cell further includes a vent configured for permitting gases to exit the battery cell.

In some embodiments, the battery cell further includes a porous isolation slot disposed within the region between the electrode stack and the interior surface configured for channeling the gases within the battery cell to the vent.

In some embodiments, the separator includes a solid electrolyte separator.

In some embodiments, the separator includes a polymerized separator configured for facilitating ion transfer between the anode and the cathode, and the battery cell further includes a liquid electrolyte.

In some embodiments, the electrode stack includes a plurality of anodes, each including one of a plurality of the first conductive tabs. The electrode stack further includes a plurality of cathodes, each including one of a plurality of the second conductive tabs. The plurality of anodes and the plurality of cathodes are arranged in an alternating pattern. The electrode stack further includes a separator disposed between each of the plurality of anodes and each of the plurality of cathodes. Each of the plurality of the first conductive tabs is connected to the first electrical connection, and each of the plurality of the second conductive tabs is connected to the second electrical connection.

In some embodiments, the anode includes silicon or lithium metal.

According to one alternative embodiment, a cylindrical battery cell is provided. The cylindrical battery cell includes a cylindrical external case including an interior surface with a first round shape. The cylindrical battery cell further includes an electrode stack disposed within the external case. The electrode stack includes a plurality of anodes, each including one of a plurality of first conductive tabs. The electrode stack further includes a plurality of cathodes, each including one of a plurality of second conductive tabs. The plurality of anodes and the plurality of cathodes are arranged in an alternating pattern. The electrode stack further includes a plurality of separators, wherein one of the plurality of separators is disposed between each of the plurality of anodes and each of the plurality of cathodes. The cylindrical battery cell further includes a positive terminal and a negative terminal. The cylindrical battery cell further includes a first electrical connection attached to each of the plurality of first conductive tabs and to the negative terminal and a second electrical connection attached to each of the plurality of second conductive tabs and to the positive terminal. The cylindrical battery cell further includes a support plate disposed next to an end of the electrode stack and a compression spring. The compression spring is configured for providing a compressive force upon the support plate and the electrode stack and displacing when the electrode stack volumetrically expands. The plurality of anodes, the plurality of cathodes, and the plurality of separators each include a common component perimeter. The common component perimeter includes a first portion of the common component perimeter including a second round shape to match the interior surface and a second portion of the common component perimeter including a flat side configured to recede from the first round shape of the interior surface. The second portion of the common component perimeter of each of the plurality of anodes, the second portion of the common component perimeter of each of the plurality of cathodes, and the second portion of the common component perimeter of each of the plurality of separators are aligned and create a region between the electrode stack and the interior surface. The plurality of first conductive tabs, the plurality of second conductive tabs, the first electrical connection, and the second electrical connection are disposed within the region between the electrode stack and the interior surface.

In some embodiments, the cylindrical battery cell further includes a separation bracket disposed in the region between the electrode stack and the interior surface configured for separating the plurality of first conductive tabs and the plurality of second conductive tabs.

In some embodiments, each of the plurality of separators includes a solid electrolyte separator.

In some embodiments, each of the plurality of anodes includes silicon or lithium metal.

According to one alternative embodiment, an electrode stack for use within a cylindrical battery cell is provided. The electrode stack includes a plurality of anodes, each including one of a plurality of first conductive tabs. The electrode stack further includes a plurality of cathodes, each including one of a plurality of second conductive tabs. The plurality of anodes and the plurality of cathodes are arranged in an alternating pattern. The electrode stack further includes a plurality of separators, wherein one of the plurality of separators is disposed between each of the plurality of anodes and each of the plurality of cathodes. The electrode stack further includes a first electrical connection attached to each of the plurality of first conductive tabs and a second electrical connection attached to each of the plurality of second conductive tabs. The plurality of anodes, the plurality of cathodes, and the plurality of separators each include a common component perimeter. The common component perimeter includes a first portion of the common component perimeter including a round shape configured for matching a round interior surface of an external case of the cylindrical battery cell. The common component perimeter further includes a second portion of the common component perimeter including a flat side configured to recede from the round interior surface. The second portion of the common component perimeter of each of the plurality of anodes, the second portion of the common component perimeter of each of the plurality of cathodes, and the second portion of the common component perimeter of each of the plurality of separators are aligned and configured for creating a region between the electrode stack and the round interior surface.

In some embodiments, each of the plurality of separators includes a solid electrolyte separator.

In some embodiments, each of the plurality of anodes includes silicon or lithium metal.

The above features and advantages and other features and advantages of the present disclosure are readily apparent from the following detailed description of the best modes for carrying out the disclosure when taken in connection with the accompanying drawings.

DETAILED DESCRIPTION

Figure 1:
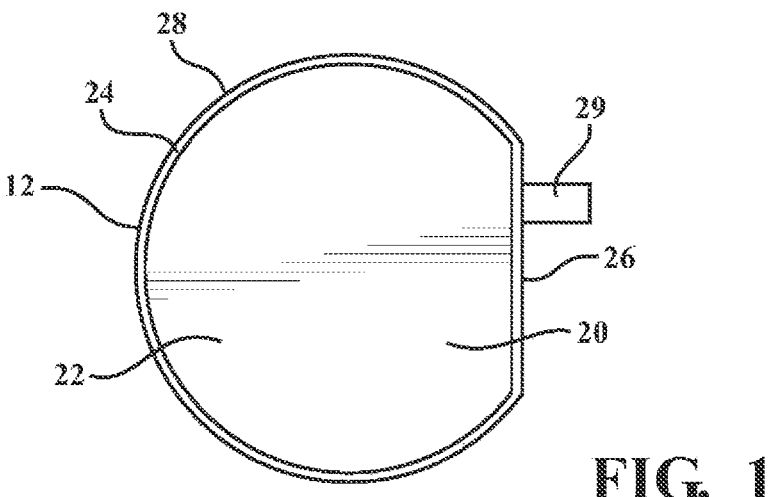
FIG. 1 schematically illustrates in top view an exemplary cathode including a perimeter including a circular outer perimeter and a flat side, in accordance with the present disclosure.

A battery system may include one or more solid-state battery cells. A solid-state battery cell may include an anode electrode, a cathode electrode, and a solid electrolyte.

A solid-state battery includes a solid electrolyte, which provides for or facilitates ion transfer between the anode electrode and the cathode electrode. The solid electrolyte further acts as a physical separator between the anode electrode and the cathode electrode, thereby preventing internal short circuits within the battery.

A jelly roll electrode includes a flexible anode, a flexible separator, and a flexible cathode wrapped around a core such that a spiral shape is created in the electrode. A cylindrical battery cell with a tabless jelly roll electrode utilized in the art may utilize lithium metal and/or high-silicon content in anodes to increase energy density in the battery cell. Such a configuration may experience an overpressure issue due to significant expansion of the lithium metal or high-silicon content anodes during lithiation. As the layers of the jelly roll electrode thicken due to the expansion, the electrode may press against a cylindrical external case thereby resulting in the overpressure issue.

A high energy density cylindrical battery cell design with stacked high-coating-ratio electrodes is provided. The battery cell includes at least one electrode stack that contains a plurality of monocells. A monocell includes one anode, one cathode and two separators with one separator between each anode and each cathode.

A monocell may include a common component perimeter. In one example, a monocell may include a first portion of the common component perimeter including a circular outer perimeter, for example, configured to correspond to an inner surface of a cylindrical external case of the battery cell. The monocell may include a second portion of the common component perimeter, including a flat side of the common component perimeter. Each of the anode, the cathode, and the separator(s) of the monocell may include the same common component perimeter including the first portion including the circular outer perimeter and the second portion including the flat side. When stacked together into the monocell, the second portions including the flat sides of each of the anode, the cathode, and the separator(s) may align, such that the monocell collectively has exhibits the common component perimeter, with the circular outer perimeters being aligned and with the flat sides being aligned. When placed within the cylindrical external case of the battery cell, the circular outer perimeter of the monocell aligns with the interior surface of the external case, and the flat side of the monocell creates an open region with the external case. A first tab may be attached to the anode along the flat side of the anode, and a second tab may be attached to the cathode along the flat side of the cathode, such that electrical connections may be made to the first tab and the second tab within the open region of the external case. The electrical connections may include a first electrical connection connecting the first tab attached to the anode to a negative terminal of the battery cell and a second electrical connection connecting the second tab attached to the cathode to a positive terminal of the battery cell. A plurality of monocells or a repeating pattern of monocells may be stacked within the battery cell, such that an electrode stack is created within the battery cell.

The electrode design with the anode including the first tab along the flat side of the anode and the cathode including the second tab along the flat side of the cathode electrode aligns the tabs and space needed for electrical connections along one side of the electrode stack. This flat side and tab design enables a substantial majority of the flat planar faces of the anode and cathode to include electrode coatings including respective anode active materials and cathode active materials. The resulting electrodes include excellent energy density. Further, as the flat electrodes are stacked within the battery cell, a support plate combined with one or more springs may be utilized to accept the volumetric expansion of the anodes in the electrode stack as the anodes are lithiated. This ability to accept considerable volumetric expansion enables the use of lithium metal and/or silicon in relatively high concentrations, further providing for excellent energy density. The resulting battery cell configuration exhibits excellent energy density and excellent resistance to/acceptance of anode volumetric expansion.

The disclosed anodes and cathodes useful for creating electrode stacks within a cylindrical cell provide a high active material coating ratio by placing both tabs on the notched flat edge of the round electrodes, which increases the cell energy density.

The conductive tab connection has high space utilization efficiency by folding, flattening, and welding the electrode tabs to an electrical connector in vertical direction that is perpendicular to stacked electrode planes.

The disclosed electrodes can be produced using the similar electrode coating with a few minor changes. Therefore, they can be produced in large scale and with a relatively fast process to lower the processing cost, overcome the mass production difficulty as compared to electrodes requiring more complex shapes.

A separation bracket or isolation slot may be disposed between the cathode conductive tabs and the anode conductive tabs to prevent cell short circuits. The separation bracket may also act as an alignment aid during battery cell assembly.

The resulting battery cell design has a relatively short current path and provides excellent low cell resistance.

The disclosed battery cell design may be applied to cylindrical cells with various chemistries, including traditional lithium-ion cells with liquid electrolyte and solid-state batteries including solid electrolyte separators, or cells with high-expansion anodes, including relatively high silicon content and/or lithium metal. The cylindrical cell design with stacking assembly is particularly useful for solid-state batteries with rigid and brittle solid electrolyte films, as the flat layers of embodiments of the electrode stack are not bent or deformed to a curve shape in the disclosed battery cell configuration.

The disclosed battery cell design provides the venting of gases through the region where the electrical connectors are routed. In one embodiment, the separation bracket or the isolation slot may have pores to allow gases go through the bracket or slot while venting.

The battery cell design can be applied to cylindrical cells with various dimensions and aspect ratios.

Figure 2:
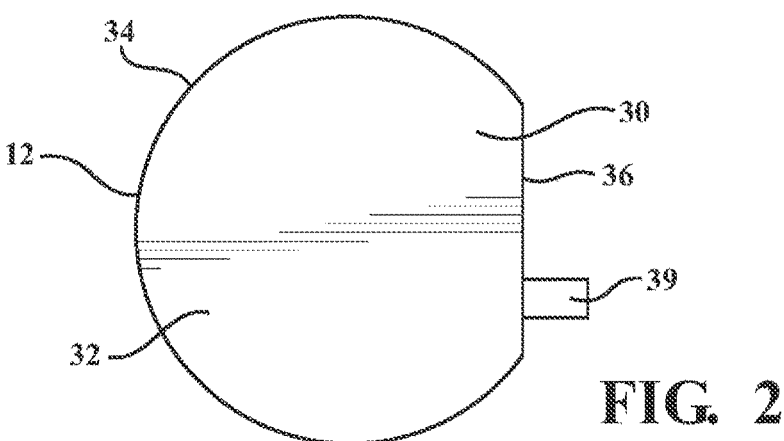
FIG. 2 schematically illustrates in top view an exemplary anode including a perimeter including a circular outer perimeter and the flat side, in accordance with the present disclosure.
Figure 3:
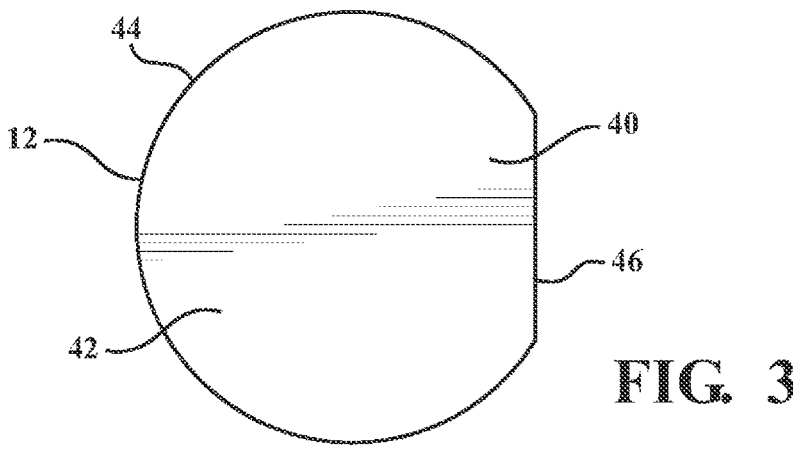
FIG. 3 schematically illustrates in top view an exemplary separator including a perimeter including a circular outer perimeter and the flat side, in accordance with the present disclosure.

FIGS. 1-3 schematically illustrate components to an electrode stack, each including a common component perimeter 12, such that when each of the cathode 20, the anode 30, and the separator 40 are stacked and aligned, the flat sides 26, 36, 46 respectively, thereof, align with each other. FIG. 1 schematically illustrates in top view an exemplary cathode 20 including a perimeter including a circular outer perimeter 24 and a flat side 26. The cathode 20 includes a flat panel face 22 which may be covered with a cathode electrode including a cathode active material, a binder, and conductive material. The cathode 20 further includes a current collector which electrically connects with or is formed unitarily with conductive tab 29. The cathode 20 further includes an insulator 28 surrounding the cathode 20, such that the cathode 20 and the active materials thereof do not come into electrically conductive contact with other portions of the battery cell, for example, including the external case.

FIG. 2 schematically illustrates in top view an exemplary anode 30 including a perimeter including a circular outer perimeter 34 and the flat side 36. The anode 30 includes a flat panel face 32 which may be covered with an anode electrode including an anode active material, a binder, and conductive material. The anode 30 further includes a current collector which electrically connects with or is formed unitarily with conductive tab 39.

FIG. 3 schematically illustrates in top view an exemplary separator 40 including a perimeter including a circular outer perimeter 44 and the flat side 46. The separator 40 includes a flat panel face 42 which is configured for being positioned next to the flat panel face 22 of FIG. 1 or the flat panel face 32 of FIG. 2. The separator 40 is constructed with a material configured for facilitating ion transfer between the cathode 20 and the anode 30 and facilitating the electrochemical reaction of the battery cell. In one embodiment, the separator 40 may be constructed with a polymerized separator material and may be configured for use with a liquid electrolyte within the battery cell. In another embodiment, the separator 40 may be constructed with a solid electrolyte separator material.

Figure 4:
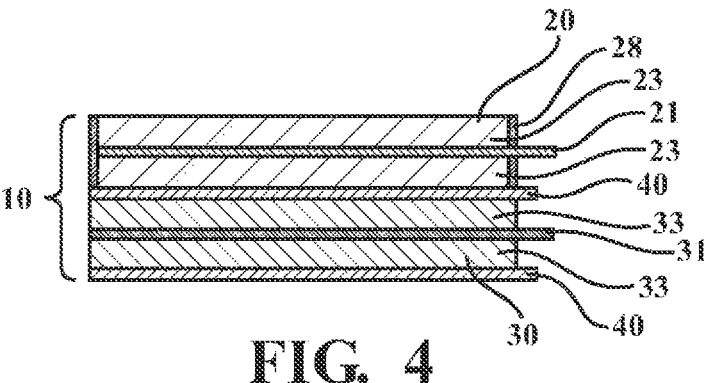
FIG. 4 schematically illustrates in side view a monocell including the cathode of FIG. 1 and the anode of FIG. 2, with the separator of FIG. 3 disposed therebetween, in accordance with the present disclosure.

FIG. 4 schematically illustrates in side view a monocell 10 including the cathode 20 of FIG. 1 and the anode 30 of FIG. 2, with the separator 40 of FIG. 3 disposed therebetween. Within a battery cell and in the presence of an electrolyte, the monocell 10 may function as a battery cell, with an electrochemical reaction within the monocell 10 generating electrical energy. The illustrated cathode 20 includes a current collector 21 which may be constructed with aluminum. On a first flat panel face 22 of FIG. 1 on top of the current collector 21, a first cathode electrode 23 is formed. In a second flat panel face 22 of FIG. 1 on bottom of the current collector 21, a second cathode electrode 23 is formed. The insulator 28 is illustrated surrounding the cathode electrode 23.

The illustrated anode 30 includes a current collector 31 which may be constructed with copper. On a first flat panel face 32 of FIG. 2 on top of the current collector 31, a first anode electrode 33 is formed. In a second flat panel face 32 of FIG. 2 on bottom of the current collector 31, a second anode electrode 33 is formed. A first separator 40 is illustrated disposed between the cathode 20 and the anode 30. A second optional separator 40 is illustrated disposed next to and below the anode 30.

Figure 5:
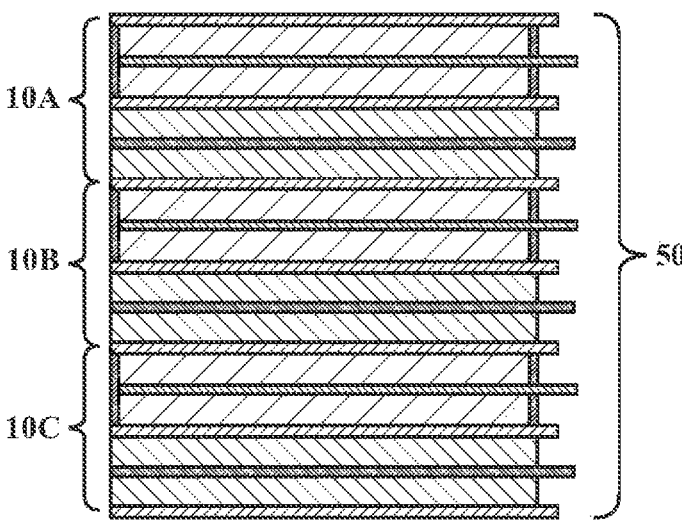
FIG. 5 schematically illustrates a plurality of monocells arranged into an electrode stack, in accordance with the present disclosure.

FIG. 5 schematically illustrates a plurality of monocells 10A, 10B, 10C arranged into an electrode stack 50.

Figure 6:
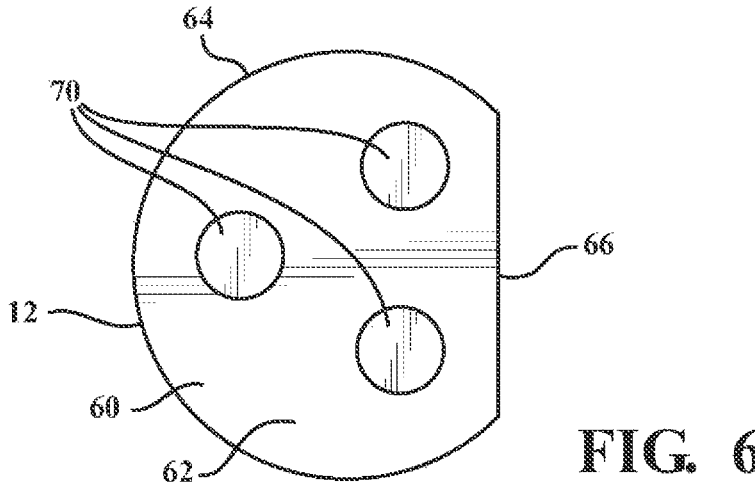
FIG. 6 schematically illustrates an exemplary support plate and a plurality of compression springs, in accordance with the present disclosure.

FIG. 6 schematically illustrates an exemplary support plate 60 and a plurality of compression springs 70. The support plate 60 and the compression springs 70 are configured for applying a compressive force upon the electrode stack 50 of FIG. 5. The compression springs 70 are configured for enabling the support plate 60 to displace when the electrode stack 50 expands due to lithiation of the anode(s) 30 of the electrode stack 50. The support plate 60 may include the common component perimeter 12, such that a circular outer perimeter 64 and a flat side 66 of the support plate 60 may be aligned with the components of the electrode stack 50. The support plate 60 includes a flat panel face 62 configured to be attached to the compression springs 70 and/or configured for being disposed next to a flat component of the electrode stack 50.

Figure 7:
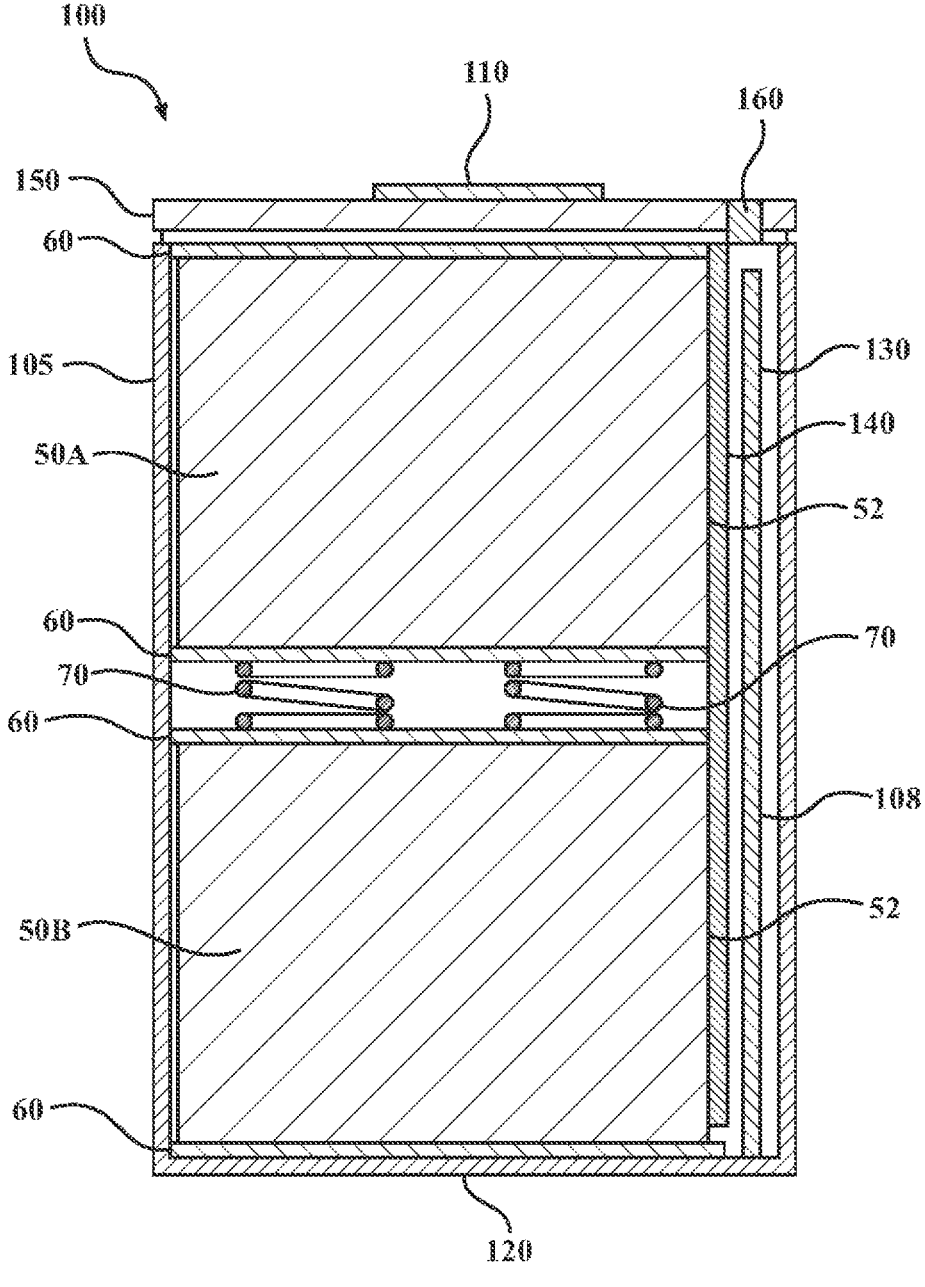
FIG. 7 schematically illustrates in side sectional view a cylindrical battery cell, in accordance with the present disclosure.

FIG. 7 schematically illustrates in side sectional view a cylindrical battery cell 100. The cylindrical battery cell 100 includes a cylindrical external case 105, a positive terminal 110, and a negative terminal 120. A first electrode stack 50A and a second electrode stack 50B are illustrated disposed within the cylindrical external case 105. Support plates 60 are illustrated disposed on either side of each of the electrode stacks 50A, 50B. Compression springs 70 are illustrated disposed between an inner two of the support plates 60, such that as the electrode stacks 50A, 50B volumetrically expand, the compression springs 70 may compress and provide extra volume for the electrode stacks 50A, 50B within the cylindrical battery cell 100. The components of the electrode stacks 50A, 50B and the support plates 60 may each include the common component perimeter 12 of FIGS. 1-3 and 6, with flat sides 52 of the electrode stacks 50A, 50B and corresponding flat sides of the support plates 60 being aligned such that a region 108 is provided within the cylindrical battery cell 100. A first electrical connection 130 within the region 108 is illustrated connected to the conductive tabs 39 of the anodes 30 of FIG. 2 disposed within the electrode stacks 50A, 50B. The first electrical connection 130 is conductively connected to the negative terminal 120. A second electrical connection 140 within the region 108 is illustrated connected to the conductive tabs 29 of the cathodes 20 of FIG. 1 within the electrode stacks 50A, 50B. The second electrical connection 140 is conductively connected to the positive terminal 110. A cap 150 is secured to a top of the cylindrical outer case 105 and secures contents therewithin. A vent 160 may be disposed within the cap 150 enabling gases to escape the cylindrical battery cell 100.

Figure 8:
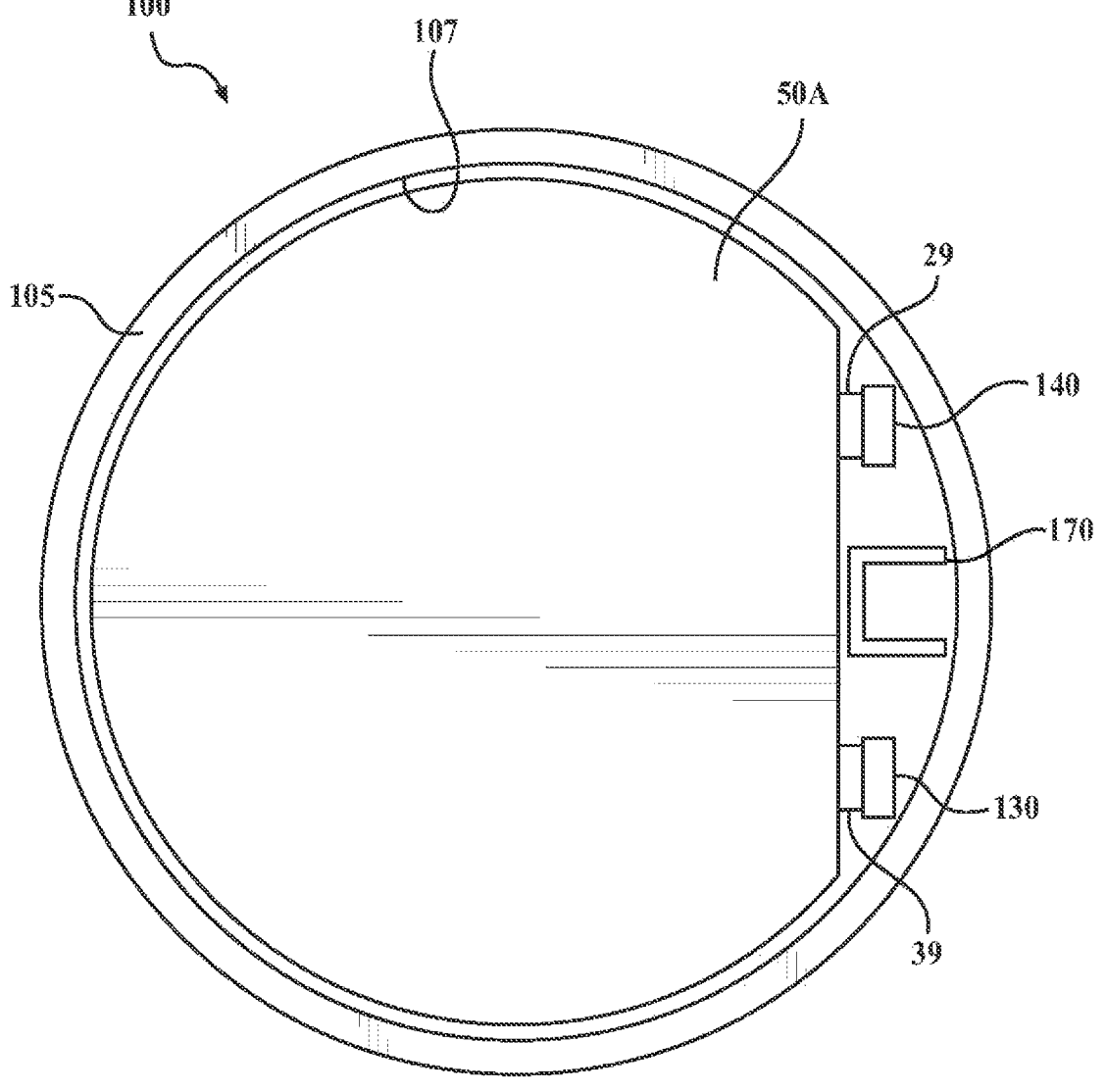
FIG. 8 schematically illustrates the cylindrical battery cell of FIG. 7 in a top view, in accordance with the present disclosure.

FIG. 8 schematically illustrates the cylindrical battery cell 100 of FIG. 7 in a top view. The cylindrical battery cell 100 is illustrated with the cap 150 removed. The external case 105 is illustrated, including an inner surface 107. The electrode stack 50A is illustrated, with a perimeter conforming to the inner surface 107 except along the flat side of the electrode stack 50A. The conductive tabs 29, 39 are illustrated extending from the electrode stack 50A and in direct connection with the second electrical connection 140 and the first electrical connection 130, respectively. An optional tab separation bracket 170 is illustrated disposed between the conductive tab 29 and the conductive tab 39. The separation bracket 170 is configured for preventing accidental contact between the conductive tab 29 and the conductive tab 39. The separation bracket 170 can help the alignment of the electrode stacking during assembly. The separation bracket 170 may additionally facilitate gases being channeled to the vent 160 of FIG. 7.

The cylindrical battery cell 100 is illustrated as a cylinder. In other forms, a battery cell may take a form of a cube, a rectangular outer case, a case with a hexagonal cross section, or other shapes. The electrode stack 50 of FIG. 5 and the other components of the cylindrical battery cell 100 may be adapted to other shapes. In an embodiment, wherein the case includes the hexagonal cross section, the anodes, cathodes, separators and support plates may include a common component perimeter mostly matching a hexagonal interior surface of the case. A cut-out may be created upon the common component perimeter, such that anode conductive tabs and cathode conductive tabs may each be connected to respective electrical connectors. The cut-out may include a flat side of the common component perimeter receded away from the interior surface of the case. The cut-out may include a concave divot formed in one of the flat sides of the hexagonal shape. The cut-out may be other shapes or may be an irregular shape.

While the best modes for carrying out the disclosure have been described in detail, those familiar with the art to which this disclosure relates will recognize various alternative designs and embodiments for practicing the disclosure within the scope of the appended claims.

What is claimed is:

1. A battery cell, comprising:
an external case including an interior surface;
an electrode stack disposed within the external case and including:
a first electrode stack and a second electrode stack;
an anode including a first conductive tab;
a cathode including a second conductive tab; and
a separator;
a positive terminal;
a negative terminal;
a first electrical connection attached to the first conductive tab and to the negative terminal;
a second electrical connection attached to the second conductive tab and to the positive terminal;
a first support plate disposed next to an end of the first electrode stack;
a second support plate disposed against an end of the second electrode stack; and
at least one compression spring configured for:
providing a compressive force upon the first and second support plates and the first and second electrode stacks; and
displacing when the first and/or second electrode stacks volumetrically expand; and
wherein the anode, the cathode, and the separator each include a common component perimeter including:
a first portion of the common component perimeter configured for conforming to a shape of the interior surface; and a second portion of the common component perimeter including a cut-out configured to recede from the interior surface;

wherein the second portion of the common component perimeter of the anode, the second portion of the common component perimeter of the cathode and the second portion of the common component perimeter of the separator are aligned and create a region between the electrode stack and the interior surface; and wherein the first conductive tab, the second conductive tab, the first electrical connection, and the second electrical connection are disposed within the region between the electrode stack and the interior surface.

2. The battery cell of claim 1, wherein the at least one compression spring includes a plurality of compression springs.

3. The battery cell of claim 1, wherein the external case is a cylinder;

wherein the interior surface includes a first round shape;

wherein the first portion of the common component perimeter includes a second round shape configured to match the interior surface.

4. The battery cell of claim 3, wherein the second portion of the common component perimeter includes a flat side.

5. The battery cell of claim 1, further comprising a separation bracket disposed in the region between the electrode stack and the interior surface configured for separating the first conductive tab and the second conductive tab.

6. The battery cell of claim 1, further comprising a vent configured for permitting gases to exit the battery cell.

7. The battery cell of claim 6, further comprising a porous isolation slot disposed within the region between the electrode stack and the interior surface configured for channeling the gases within the battery cell to the vent.

8. The battery cell of claim 1, wherein the separator includes a solid electrolyte separator.

9. The battery cell of claim 1, wherein the separator includes a polymerized separator configured for facilitating ion transfer between the anode and the cathode; and further comprising a liquid electrolyte.

10. The battery cell of claim 1, wherein the electrode stack includes:

a plurality of anodes, each including one of a plurality of the first conductive tabs;

a plurality of cathodes, each including one of a plurality of the second conductive tabs, wherein the plurality of anodes and the plurality of cathodes are arranged in an alternating pattern; and a separator disposed between each of the plurality of anodes and each of the plurality of cathodes; and wherein each of the plurality of the first conductive tabs is connected to the first electrical connection; and wherein each of the plurality of the second conductive tabs is connected to the second electrical connection.

11. The battery cell of claim 1, wherein the anode includes silicon or lithium metal.

12. A cylindrical battery cell, comprising:

a cylindrical external case including an interior surface with a first round shape;

an electrode stack disposed within the external case and including:

a first electrode stack and a second electrode stack;

a plurality of anodes, each including one of a plurality of first conductive tabs;

a plurality of cathodes, each including one of a plurality of second conductive tabs, wherein the plurality of anodes and the plurality of cathodes are arranged in an alternating pattern; and a plurality of separators, wherein one of the plurality of separators is disposed between each of the plurality of anodes and each of the plurality of cathodes; and a positive terminal;

a negative terminal;

a first electrical connection attached to each of the plurality of first conductive tabs and to the negative terminal;

a second electrical connection attached to each of the plurality of second conductive tabs and to the positive terminal;

a first support plate disposed next to an end of the first electrode stack;

a second support plate disposed against an end of the second electrode stack; and at least one compression spring configured for:

providing a compressive force upon the first and second support plates and the first and second electrode stacks; and displacing when the first and/or second electrode stacks volumetrically expands; and wherein the plurality of anodes, the plurality of cathodes, and the plurality of separators each include a common component perimeter including:

a first portion of the common component perimeter including a second round shape to match the interior surface; and a second portion of the common component perimeter including a flat side configured to recede from the first round shape of the interior surface;

wherein the second portion of the common component perimeter of each of the plurality of anodes, the second portion of the common component perimeter of each of the plurality of cathodes, and the second portion of the common component perimeter of each of the plurality of separators are aligned and create a region between the electrode stack and the interior surface; and wherein the plurality of first conductive tabs, the plurality of second conductive tabs, the first electrical connection, and the second electrical connection are disposed within the region between the electrode stack and the interior surface.

13. The cylindrical battery cell of claim 12, further comprising a separation bracket disposed in the region between the electrode stack and the interior surface configured for separating the plurality of first conductive tabs and the plurality of second conductive tabs.

14. The cylindrical battery cell of claim 12, wherein each of the plurality of separators includes a solid electrolyte separator.

15. The cylindrical battery cell of claim 12, wherein each of the plurality of anodes includes silicon or lithium metal.

16. The cylindrical battery cell of claim 12, wherein the at least one compression spring includes a plurality of compression springs.

17. The cylindrical battery cell of claim 12, wherein the external case is a cylinder;

wherein the interior surface includes a first round shape;

wherein the first portion of the common component perimeter includes a second round shape configured to match the interior surface.

18. The cylindrical battery cell of claim 17, wherein the second portion of the common component perimeter includes a flat side.

19. The cylindrical battery cell of claim 12, further comprising a vent configured for permitting gases to exit the battery cell.

20. The cylindrical battery cell of claim 19, further comprising a porous isolation slot disposed within the region between the electrode stack and the interior surface configured for channeling the gases within the battery cell to the vent.

\* \* \* \* \*